C. C. BUTLER.
FRICTION PULLEY.
APPLICATION FILED DEC. 26, 1911.
1,036,794.
Patented Aug. 27, 1912.
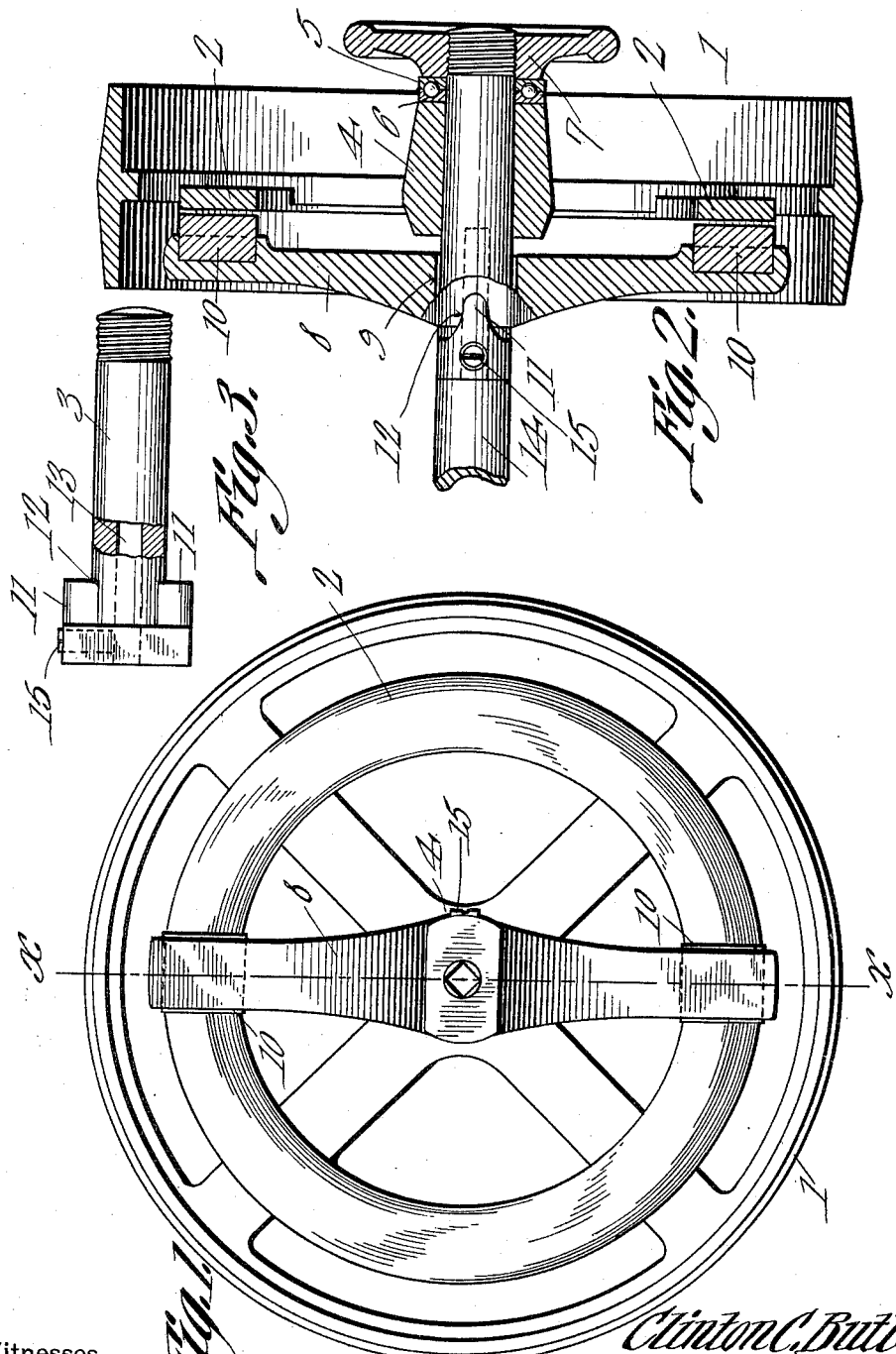
Witnesses
Clinton C. Butler,
Inventor
by C.A. Snow & Co.
Attorneys

UNITED STATES PATENT OFFICE.

CLINTON C. BUTLER, OF WATERLOO, IOWA.

FRICTION-PULLEY.

1,036,794.  Specification of Letters Patent.  Patented Aug. 27, 1912.

Application filed December 26, 1911. Serial No. 667,642.

*To all whom it may concern:*

Be it known that I, CLINTON C. BUTLER, a citizen of the United States, residing at Waterloo, in the county of Blackhawk and State of Iowa, have invented a new and useful Friction-Pulley, of which the following is a specification.

This invention relates to improvements in what may be termed friction pulleys.

The object of the invention is to provide for readily effecting the coupling or clutching operation frictionally.

A further object is to provide for readily accommodating the movement of the engaging or clutching parts to any inequalities which may intervene therebetween or on account of other cause.

A still further object is to carry out the aforesaid end in a simple, inexpensively and effective manner.

The invention consists of certain instrumentalities and features substantially as hereinafter fully disclosed and defined by the claims.

In the accompanying drawing, illustrating the preferred embodiment of my invention wherein it will be understood that various changes and modifications may be made as relates to the detailed construction and arrangement of the parts without departing from the spirit of the invention, Figure 1 is a side elevation thereof with the shaft removed; Fig. 2 is a sectional elevation taken on the line $x$—$x$ of Fig. 1; Fig. 3 is a partly side view, and partly sectional view of the clutch adjusting screw.

In carrying out my invention, I provide a pulley 1 of the band or belt type provided, in its web portion with a slightly outstanding annular member 2 for forming a frictional contacting surface or face. A screw-threaded member 3, cylindrical in cross section, is inserted through the hub 4 of the pulley 1, the screw threaded portion of said member 3 extending beyond said hub, together with a limited plane or unthreaded portion thereof. The projecting unthreaded portion of the member 3 has inserted thereon a sectional boxing 5; containing a plurality of preferably steel balls 6 or fibrous washers, while upon the extended screw-threaded portion of the member 2 is received or fitted a hand-wheel or disk equipped nut 7 bearing or contacting at its inner surface with said frictional-ball boxing whereby friction will be reduced at such point as is well understood. The ball-bearing boxing or contrivance preferably includes opposed rings, one contacting with the outer end of the pulley-hub 4 and the other ring having rotatable contact with the hub-engaging or contacting ring. A transverse bar or member 8 is carried by the member or screw 3, said bar or member 8 having a central opening 9 therethrough, somewhat greater as seen in Fig. 2 than the cross-section of the member 3, which it receives. The member or bar 8 is equipped at its ends, upon the inner surface, with preferably wooden blocks or shoes 10 for suitably inducing friction or a gripping action, by the contact thereof with the annular metallic member 2 of the pulley 1, said shoes or blocks being adapted to stand opposite said member 2 as disclosed in Figs. 1 and 2. The shoe-carrying or clutch member 8 is suitably held upon the member 3, preferably by means of outstanding lugs 11 at one end of the member 3, said lugs being received by conforming notches 12 produced in the member 8, the member 3 having a bore 13, receiving the shaft 14, or reduced portion thereof, and a screw 15 for holding the member 3 to said shaft.

It will be noted that the surfaces of the offset lugs 11 of the member 3 and the walls of the notches 12 of the member 8 are rounded or curved at their points of contact and otherwise mutually conformed in outline, whereby, in connection with the spacing of the walls of the opening 9 in said member 8 with respect to said adjusting member 3, said member 8 may have a variable movement, to allow its clutch-shoes to accommodate themselves to any inequalities in the contacting surfaces therebetween and the friction inducing surface or member 2 of the pulley. This device has no bearing upon the clutching-operation, but is designed to enable the clutch-shoes to readily accommodate themselves to irregularities which may casually occur in their meeting surface or faces as above indicated.

What is claimed is:—

1. In a device of the type described, the combination of a shaft-member carrying a rotatable member, and a clutch-shoe equipped member having a central opening receiving said shaft-member, the walls of said opening being spaced off from said shaft-member, said clutch-shoe equipped member being adapted to have frictional contact with said rotatable member, said shaft-member having a lateral lug and said clutch-shoe equipped member having a notch receiving said lateral lug, said lug being adapted to have limited independent movement within said notch.

2. In a device of the type described, the combination of a shaft-member, a clutch-shoe equipped member having a central orifice receiving said shaft-member, the walls of said orifice being spaced off from said shaft-member, said clutch-shoe equipped member having a notch with rounded lateral and end walls, said shaft-member having a conforming lug received by said notch and a pulley carried by said shaft-member and adapted to have frictional contact with said clutch-shoe.

In testimony that I claim the foregoing as my own, I have hereto affixed my signature in the presence of two witnesses.

CLINTON C. BUTLER.

Witnesses:
A. G. REID,
H. F. LICHTY.

Copies of this patent may be obtained for five cents each, by addressing the "Commissioner of Patents, Washington, D. C."